US008424086B2

(12) United States Patent
Goldman et al.

(10) Patent No.: US 8,424,086 B2
(45) Date of Patent: Apr. 16, 2013

(54) SUPPRESSION OF MALICIOUS SIP MESSAGES USING THE RESOURCE PRIORITY HEADER

(75) Inventors: Stuart O. Goldman, Scottsdale, AZ (US); Richard Krock, Naperville, IL (US)

(73) Assignee: Alcatel Lucent, Paris (FR)

( * ) Notice: Subject to any disclaimer, the term of this patent is extended or adjusted under 35 U.S.C. 154(b) by 862 days.

(21) Appl. No.: 12/507,032

(22) Filed: Jul. 21, 2009

(65) Prior Publication Data

US 2011/0023086 A1 Jan. 27, 2011

(51) Int. Cl.
*H04L 29/06* (2006.01)
(52) U.S. Cl.
USPC ............................................. 726/22; 726/13
(58) Field of Classification Search ................. 726/3, 13, 726/22–24
See application file for complete search history.

(56) References Cited

U.S. PATENT DOCUMENTS 7,660,321 B2 * 2/2010 Cortes et al. ................... 370/412
2008/0040801 A1 * 2/2008 Buriano et al. ................. 726/22

OTHER PUBLICATIONS

Schulzrinne H., "Communications Resource Priority for the Session Initiation Protocol" Feb. 1, 2006, IETF Standard Internet Engineering Task Force, RFC4412, 36 pages.
Ephrath A.R. et al. "National security and emergency preparedness (NS/EP) multimedia service in a congested network," Broadband Multimedia Systems and Broadcasting, 2008 IEEE International Symposium, Mar. 31, 2008, pp. 1-7, 7 pages.
International Search Report and Written Opinion for PCT/US2010/041896 mailed Nov. 5, 2010, 8 pages.

* cited by examiner

*Primary Examiner* — Ali Abyaneh
(74) *Attorney, Agent, or Firm* — Garlick & Markison; Holly L. Rudnick

(57) ABSTRACT

An Internet Service Provider (ISP) node is configured to suppress malicious session initiation protocol (SIP) messages. The ISP node is coupled to receive a new session initiation protocol (SIP) message from a user agent client associated with the ISP. If the SIP message includes a resource priority header (RPH) indicating the new SIP message should be given priority within the network, the ISP node determines whether the user agent client previously sent an initial SIP message with an RPH that has not yet been authorized, and if so, places the new SIP message in a buffer.

20 Claims, 6 Drawing Sheets

SUPPRESSION OF MALICIOUS SIP MESSAGES USING THE RESOURCE PRIORITY HEADER

BACKGROUND OF THE INVENTION

1. Technical Field of the Invention

The present invention relates in general to the session initiation protocol (SIP), and in particular, to suppressing malicious clients that use the SIP resource priority header within SIP messages.

2. Description of Related Art

In Internet Protocol (IP) based networks, a single client device can inject a large number of new call/session attempts into the network in rapid order. For example, a session initiation protocol (SIP) client can transmit numerous successive SIP INVITE messages into the network. The ability of a SIP client to flood the network with SIP INVITE messages can be seen as a potential attack on the network to cause denial of service to other subscribers. This denial of service can be further amplified by the inclusion of a Resource Priority Header (RPH) in the SIP INVITE message.

The RPH is an optional parameter that can be included in the SIP INVITE message either by the originating SIP device or a subsequent node. The purpose of the RPH is to indicate to the network that the particular call/session request should be given priority when the network is in congestion and cannot support all of the requests for service. For example, during times of congestion caused by a crisis situation, first responders and other government personnel need to be successful in establishing calls/sessions. To ensure rapid and certain connection of calls/sessions initiated by emergency personnel, the RPH can be added to the SIP INVITE messages.

Priority calls/session requests are normally validated prior to the establishment of the call/session. For example, a SIP INVITE message that includes a RPH is typically routed to a SIP authentication and authorization node in the network where the originating SIP user agent client is authenticated, and authorization for such a priority call/session is confirmed.

Unfortunately, the authentication process provides malicious clients with the opportunity to exploit the limited resources of the network by inserting a "denial of service" attack. For example, a flood of SIP INVITE messages with false RPH parameters can overwhelm the authorization and authentication function for RPH within the network. The flooding of the access network with false RPH parameters diminishes the limited capacity of the authentication and authorization nodes to handle "real" priority calls/sessions from authorized users. The excess traffic caused by the false priority requests blocks a portion of the valid requests roughly in proportion to the percentage of "real" verses "false" attempts. Although the false attempts will eventually fail to be authenticated, the damage caused by the false attempts effectively blocking legitimate priority call/session attempts may prevent emergency personnel from effectively doing their job, thereby harming the public.

SUMMARY OF THE INVENTION

Embodiments of the present invention provide an Internet Service Provider (ISP) node within a communication network for suppressing malicious session initiation protocol (SIP) messages. The ISP node is coupled to receive a new session initiation protocol (SIP) message from a user agent client associated with the ISP. If the SIP message includes a resource priority header (RPH) indicating the new SIP message should be given priority within the communication network, the ISP node determines whether the user agent client previously sent an initial SIP message with an RPH that has not yet been authorized, and if so, places the new SIP message in a buffer. Additional SIP messages with the RPH subsequently received from the user agent client are also placed into the buffer if authorization of the initial SIP has not yet been received.

In a further embodiment, the ISP node initiates a timer upon receipt of the initial SIP message. If a time out of the timer occurs before authorization of the initial SIP message is received, the ISP node deletes the contents of the buffer. However, if authorization of the initial SIP message is received prior to time out of the timer, the ISP node releases the SIP messages from the user agent client in the buffer for normal processing.

Embodiments of the invention further provide a method for suppressing malicious session initiation protocol (SIP) messages. The method includes receiving a new SIP message from a user agent client at an Internet Service Provider (ISP) node associated with the user agent client via a communication network, in which the SIP message includes a resource priority header (RPH) indicating the new SIP message should be given priority within the communication network. The method further includes determining whether the user agent client previously sent an initial SIP message with an RPH that has not yet been authorized, and if so, placing the new SIP message in a buffer.

BRIEF DESCRIPTION OF THE DRAWINGS

A more complete understanding of the present invention may be obtained by reference to the following detailed description when taken in conjunction with the accompanying drawings wherein.

DETAILED DESCRIPTION OF THE DRAWINGS

Figure 1:
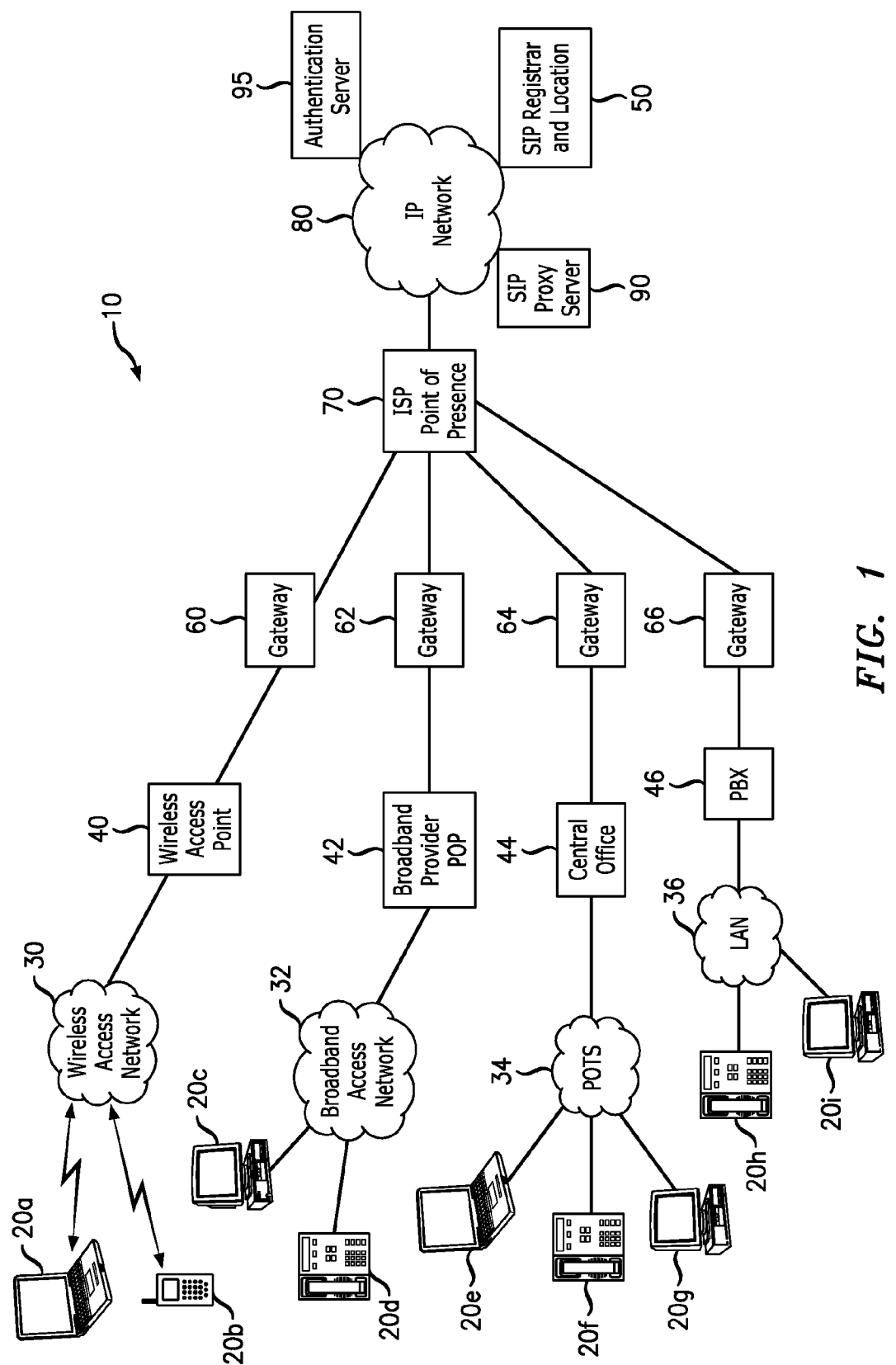
FIG. 1 illustrates an exemplary communication network connecting various access networks to an Internet Protocol (IP) based network carrying session initiation protocol (SIP) messages, in accordance with embodiments of the present invention.

Referring to FIG. 1, there is illustrated an exemplary communication network 10 capable of implementing various embodiments of the present invention. The communication network 10 includes an Internet Service Provider (ISP) node 70 that connects various access networks to an Internet Protocol (IP) based network 80 (i.e., the Internet). The ISP node 70 is a point of presence (POP) of an internet service provider positioned at the edge of the access networks. By way of example, but not limitation, such access networks can include a wireless access network 30, a broadband access network 32, the Plain Old Telephone System (POTS) network 34 and a local area network (LAN) 36.

The wireless access network 30 is a network that enables wireless communication devices to connect to another network (i.e., the IP-based network 80) via a wireless connection. For example, in an exemplary embodiment, the wireless access network 30 is a $3^{rd}$ Generation Partnership Project (i.e., 3GPP, 3GPP2, etc.) wireless network operable to serve Session Internet Protocol (SIP)-capable handheld devices, such as cell phone 20b and laptop computer 20b. A wireless access point (WAP) 40 enables wireless communication devices 20b and 20b to connect to the IP-based network 80 using Wi-Fi (IEEE 802.11) and/or other wireless standards, such as WCDMA/CDMA. In FIG. 1, the WAP 40 connects to the IP-based network 80 via a gateway/router 60 to the ISP node 70. Thus, the gateway 60, in combination with the ISP node 70, provides access to the IP-based network 80 for the wireless devices 20b and 20b.

The broadband access network 32 is a network that enables communication devices to connect to another network via Ethernet, coax cable and/or fiber. For example, in an exemplary embodiment, the broadband access network 32 is a cable network operable to serve Session Internet Protocol (SIP)-capable communication devices, such as desktop computer 20c and SIP phone 20d. A broadband provider point of presence (POP) 42 (i.e., a cable headend) enables SIP communication devices 20c and 20d to connect to the IP-based network 80 using a broadband technology. In FIG. 1, the broadband provider POP 42 connects to the IP-based network 80 via a gateway/router 62 to the ISP node 70. Thus, the gateway 62, in combination with the ISP node 70, provides access to the IP-based network 80 for the devices 20c and 20d.

The POTS network 34 is a local loop that enables residential subscribers, such as traditional narrowband (dial-up) subscribers or broadband digital subscriber line (DSL) subscribers, to connect to another network via twisted pair wires. For example, in an exemplary embodiment, the POTS network 34 is operable to serve Session Internet Protocol (SIP)-capable communication devices, such as laptop computer 20e, SIP phone 20f and desktop computer 20g. A central office 44 enables SIP communication devices 20e and 20g to connect to the IP-based network 80. In FIG. 1, the central office 44 connects to the IP-based network 80 via a gateway/router 64 to the ISP node 70. Thus, the gateway 64, in combination with the ISP node 70, provides access to the IP-based network 80 for the devices 20e-20g.

The local area network (LAN) is a network that enables communication devices to connect to another network via Ethernet, Wi-Fi or other LAN technology. For example, in an exemplary embodiment, the LAN is a private-enterprise network operable to serve Session Internet Protocol (SIP)-capable devices, such as SIP phone 20h and desktop computer 20i. A public branch exchange (PBX) 46 enables SIP communication devices 20h and 20i to connect to the IP-based network 80 using a LAN technology. In FIG. 1, the PBX 46 connects to the IP-based network 80 via a gateway/router 66 to the ISP node 70. Thus, the gateway 66, in combination with the ISP node 70, provides access to the IP-based network 80 for the devices 20h and 20i.

The ISP node 70 is configured to receive SIP request messages from user agent clients (i.e., a logical entity that creates a SIP request for a SIP call/session). For example, in one embodiment, the user agent clients are SIP softphones or SIP applications running on the SIP-enabled communication devices 20a-20i. In another embodiment, the user agent client includes a gateway 60-66 or other network node that generates a SIP request message. The SIP request message can be, for example, a SIP INVITE request message that is generated by a user agent client (caller) to establish a call/session with a user agent server (callee). However, it should be understood that the present invention is not limited to SIP INVITE request messages, but can be applied to any SIP request message.

The communication network 10 further includes a SIP Proxy Server 90, a SIP Authentication and Authorization server 95 and a SIP Registrar and Location server 50 for handling SIP messages originated by a user agent client. The SIP Proxy Server 90 is responsible for routing SIP request messages, and may also enforce policies, such as authentication policies. The SIP Authentication and Authorization server 95 represents any authorization node in the communication network 10 that is responsible for authenticating a user agent client for a SIP request message. The SIP Registrar and Location server 50 accepts SIP REGISTER requests from user agent clients to associate a SIP Uniform Resource Identifier (URI) with one or more contact addresses (locations) and provides the contact address (location) information to SIP proxy servers for use in routing SIP request messages to the appropriate callee.

In an exemplary operation, upon receiving a SIP INVITE request message to establish a call from a user agent client (caller) to a particular user agent server (callee), the ISP node 70 forwards the SIP request message to a SIP proxy server 90 via the IP-based network 80. The SIP proxy server 90 accesses the SIP registrar and location server 50 to obtain information about the callee's location and accesses the SIP Authentication and Authorization server 95 to verify that the user agent client is authorized to make the call. If the user agent client is authorized, the SIP proxy server 90 routes the SIP INVITE request message to the user agent server (callee). If the user agent client is not authorized, the SIP proxy server 90 returns an authentication failed message, such as a SIP PROXY AUTHENTICATION REQUIRED response message, to the user agent client, requesting further authentication information. In response, the user agent client can retry the SIP INVITE request, but must include valid credentials for the SIP Proxy Server 90 to forward the SIP INVITE request.

In another exemplary operation, when an ISP node 70 receives a SIP INVITE request message from a user agent client destined for a user agent server, the ISP node 70 queries the SIP Authentication and Authorization server 95 to verify that the user agent client is authorized to establish a call/session with the user agent server. If so, the ISP node 70 forwards the SIP INVITE request message to the SIP Proxy Server 90 for routing, as described above. If not, the ISP node 70 provides an authentication failed message, such as a SIP UNAUTHORIZED message or SIP FORBIDDEN message, to the user agent client. It should be understood that any node within the IP-based network 80 that receives the SIP INVITE request message may perform authentication to the SIP authentication and authorization node 95 up to and including the user agent server (callee), and that the present invention is not limited to any particular node performing the authentication.

Figure 2:
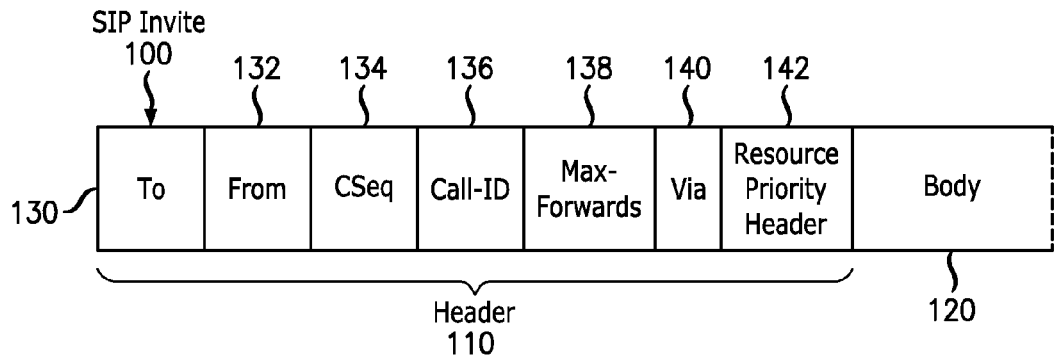
FIG. 2 illustrates an exemplary SIP INVITE request including a resource priority header (RPH), in accordance with embodiments of the present invention.

FIG. 2 illustrates an exemplary SIP INVITE request 100, in accordance with embodiments of the present invention. The SIP INVITE request 100 includes a header 110 and a body 120. The header 110 includes a number of different fields, only a few of which are shown for illustration. For example, in FIG. 2, the header fields include a To field 130, a From field 132, a Cseq field 134, a Call-ID field 136, a Max-Forwards field 138, a Via field 140 and a Resource Priority Header (RPH) field 142.

The To field 130 specifies the address-of-record (SIP URI) of the "logical" recipient or user that is the target of the request. The From field 132 includes a SIP URI that indicates the logical identity of the initiator of the request (i.e., the user agent client). The CSeq field 134 serves to identify and order transactions during a call/session. The Call-ID field 136 acts as a unique identifier for the call/session to group together a series of request/response messages for the call/session. The Max-Forwards field 138 limits the number of hops a request can transit on the way to its destination. The Via field 140 indicates the transport used for the transaction and identifies the location where the response is to be sent.

The RPH field 142 indicates that the SIP INVITE request message should be given priority within the network. For example, the request can be given elevated priority for access to PSTN gateway resources, such as trunk circuits. As another example, the request can interrupt lower-priority requests at a destination user terminal, such as an IP phone. As a further example, at SIP proxies and back-to-back user agents, the request may displace existing signaling requests or bypass PSTN gateway capacity limits in effect for lower priorities.

The RPH can be used for a variety of purposes, such as emergency preparedness or priority customers. However, since gaining prioritized access to resources offers opportunities to deny service to others, SIP request messages that include the RPH are typically subject to authentication and authorization using a SIP security mechanism.

Figure 3A:
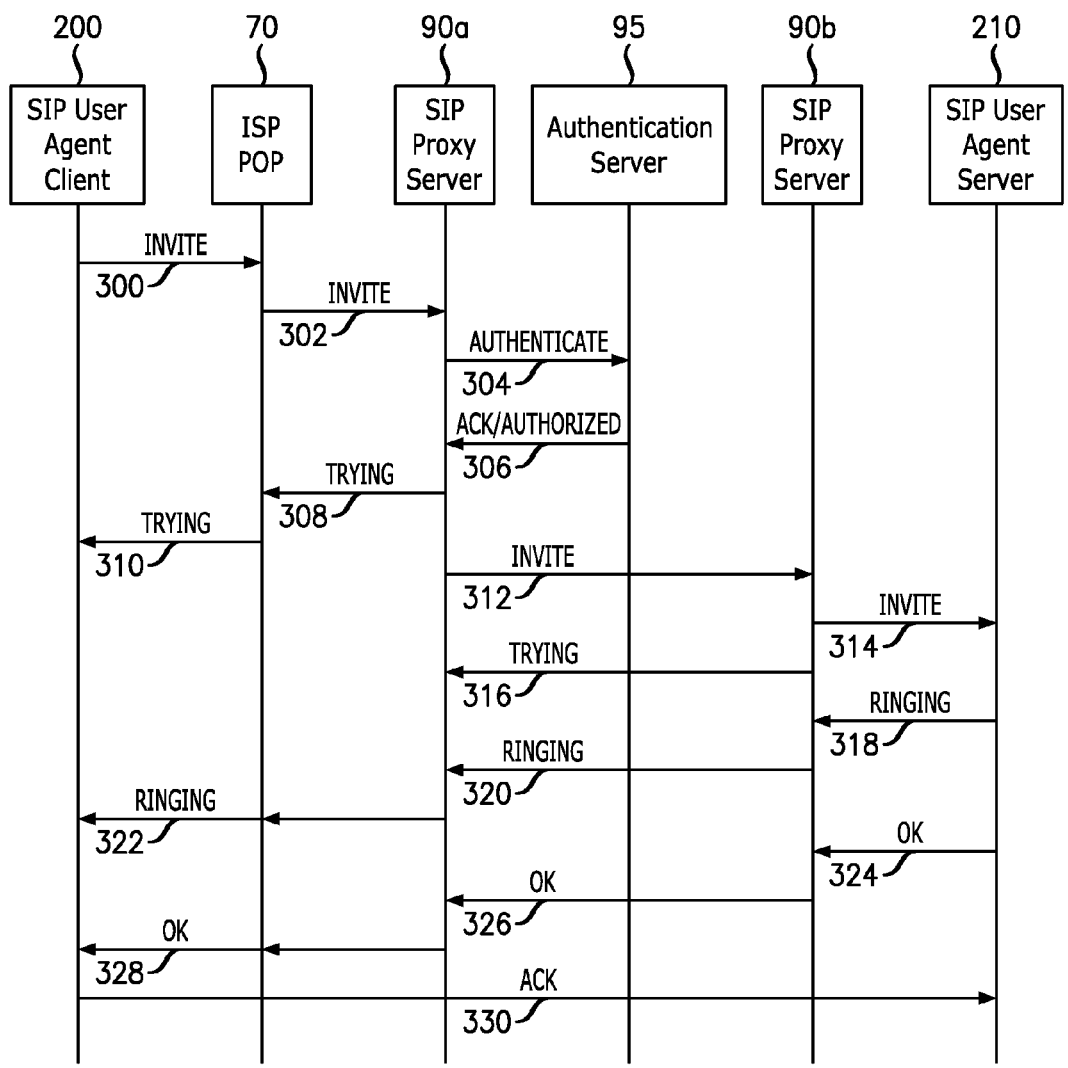
FIGS. 3A and 3B are message flow diagrams illustrating authorization of a SIP message that includes the RPH, in accordance with embodiments of the present invention.
Figure 3B:
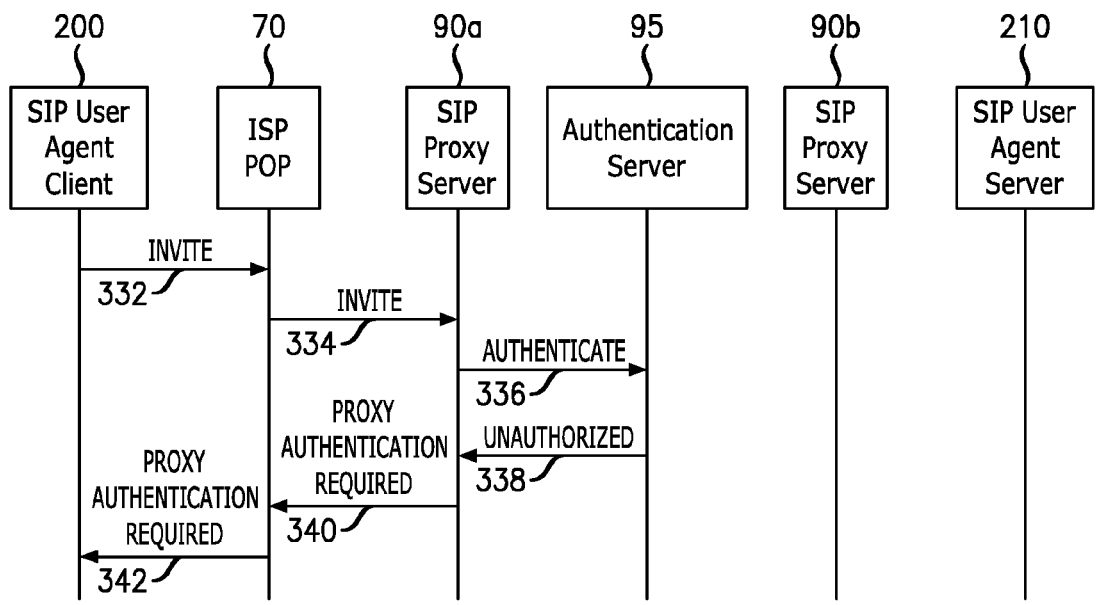

FIGS. 3A and 3B are message flow diagrams illustrating authorization of a SIP message that includes the RPH, in accordance with embodiments of the present invention. FIG. 3A illustrates a successful authorization of a SIP INVITE message, while FIG. 3B illustrates a failed authorization of a SIP INVITE message.

In FIG. 3A, a SIP user agent client 200 (caller) initiates a SIP INVITE request message with a RPH for a call/session to a SIP user agent server 210 (callee). The SIP INVITE request is routed to the ISP POP, hereinafter referred to as the ISP node, 70 at 300. In one embodiment, as shown in FIG. 3A, the ISP node 70 routes the SIP INVITE request to a SIP Proxy Server 90b that acts on behalf of the SIP user agent client 200 at 302, where authentication of the user agent client 200 is performed to a SIP authentication and authorization server 95 at 304. In another embodiment, the ISP node 70 performs the authentication prior to forwarding the SIP INVITE request to the SIP Proxy Server 90a. In other embodiments, other nodes (i.e., SIP Proxy Server 90b or SIP User Agent Server 210) perform the authentication.

If the user agent client 200 is authorized for the RPH, at 306, the SIP authentication and authorization server 95 sends an authorized acknowledgement response to the SIP Proxy Server 90a. The SIP Proxy Server then sends a Trying message to the ISP node 70 at 308, which is forwarded to the SIP user agent client 200 at 310. Thereafter, at 312, the SIP Proxy Server 90b routes the SIP INVITE request message to the SIP Proxy Server 90b acting on behalf of the SIP user agent server 210, which forwards the SIP INVITE request message to the SIP user agent server 210 at 314 and transmits a Trying response message to the originating SIP Proxy server 90b at 316.

At 318, a Ringing response message is transmitted from the SIP user agent server 210 to the SIP Proxy server 90b, which in turn routes the Ringing response message to the originating SIP Proxy server 90b at 320. The Ringing response message is then transmitted to the SIP user agent client 200 at 322. Thereafter, at 324, when the SIP user agent server (callee) answers the call/session, an OK response message is transmitted from the SIP user agent server 210 to the SIP Proxy server 90b, which forwards the OK message to the SIP user agent client 200 via the originating SIP Proxy server 90b and ISP node 70 at 326 and 328. Finally, at 330, an acknowledgement message confirming reception of the OK response is sent from the SIP user agent client 200 to the SIP user agent server 210 via the ISP node 70, bypassing the two SIP Proxy servers 90b and 90b. At this point, the media session is established and the two SIP user agents (user agent client 200 and user agent server 210) can begin exchanging media packets for the call/session.

Turning now to FIG. 3B, when the SIP user agent client 200 (caller) initiates a SIP INVITE request message with a RPH for a call/session to a SIP user agent server 210 (callee), the SIP INVITE request is again routed to the ISP node 70 at 332. In addition, the SIP INVITE request is also shown forwarded to the SIP Proxy Server 90b at 334, which performs an authentication of the SIP user agent client 200 to the SIP authentication and authorization server 95 at 336. However, it should be understood that in other embodiments, the ISP node 70 or another node in the network (i.e., SIP Proxy Server 90b or SIP User Agent Server 210) can perform the authentication.

In FIG. 3B, the user agent client 200 is not authorized for the RPH, either because of insufficient credentials or because the user agent client is not authorized for that level of service, and therefore at 338, the SIP authentication and authorization server 95 sends an unauthorized or authorization failed response to the SIP Proxy Server 90a. Thereafter, at 340 and 342, the SIP Proxy server 90b transmits a SIP PROXY AUTHENTICATION REQUIRED message to the SIP user agent client 200 via the ISP node 70. At this point, the SIP user agent client 200 can retry the SIP INVITE message including the proper credentials. However, if the SIP user agent client 200 does not later provide the appropriate credentials, the SIP INVITE request message is not forwarded to the SIP Proxy server 90b. It should be understood that in embodiments in which the SIP user agent server 210 performs the authentication, a SIP UNAUTHORIZED message would be transmitted from the SIP user agent server 210 to the SIP user agent client via the SIP Proxy servers 90b and 90b.

Figure 4:
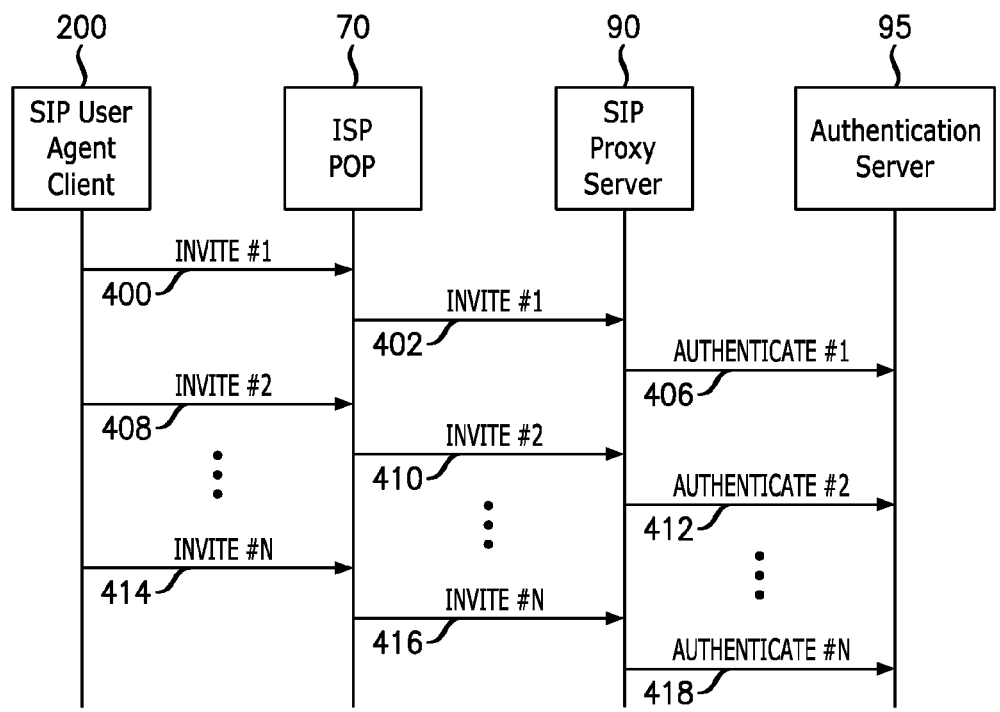
FIG. 4 is a message flow diagram illustrating a malicious denial of service attack by a user agent client using SIP messages with the RPH.

FIG. 4 is a message flow diagram illustrating a malicious denial of service attack by a user agent client 200 using SIP messages with the RPH. As can be seen in FIG. 4, the SIP user agent client 200 initiates a number of SIP INVITE request messages with the RPH. At 400, a first SIP INVITE request message with the RPH is generated and transmitted to the ISP node 70, which forwards the SIP INVITE request message to the SIP Proxy server 90 at 402. The SIP Proxy server performs an authentication of the user agent client 200 to the SIP authentication and authorization server at 406. Then, at 408, another SIP INVITE request message with the RPH is generated by the user agent client 200 and transmitted to the ISP node 70. The ISP node 70 again forwards the SIP INVITE request message to the SIP Proxy server 90 at 410, which performs another authentication to the SIP authentication and authorization server 95 at 412. Subsequent SIP INVITE request messages with the RPH are generated by the SIP user agent client 200 and transmitted to the ISP node 70 at 414. Each of the additional SIP INVITE request messages are forwarded to the SIP Proxy server 90 and authenticated with the SIP authentication and authorization server 95 at 416 and 418.

The flood of SIP INVITE messages with RPH parameters can overwhelm the SIP authorization and authentication server 95, causing a denial of service attack on the network. As a result, legitimate priority call/session attempts may not be able to be authenticated, thus preventing true "priority" calls/sessions from being established. During emergencies, where congestion is already present in the network, legitimate emergency assistance users may need to rely on the RPH to establish call/sessions. If the SIP authentication and authorization server 95 is overloaded, emergency personnel calls/sessions may fail due to inability of the SIP authentication and authorization server 95 to verify their authority to have priority in the network.

Therefore, in accordance with embodiments of the present invention, the ISP node 70 selectively forwards SIP request messages, such as SIP INVITE requests, to the SIP proxy server 90 in order to prevent a denial of service attack.

Figure 5A:
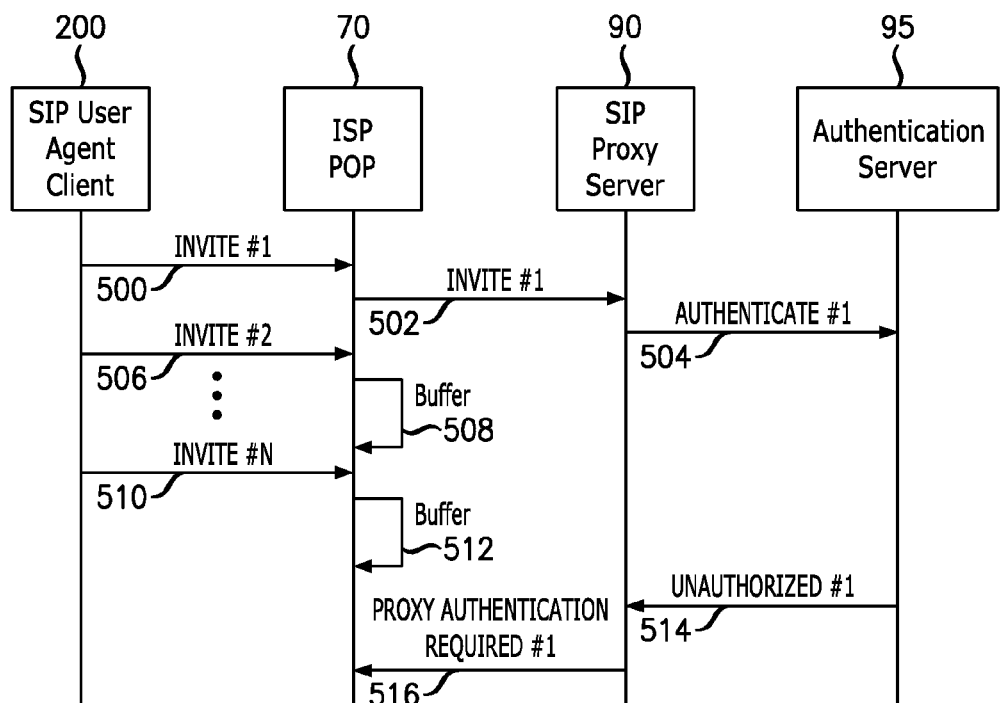
FIGS. 5A and 5B are message flow diagrams illustrating the suppression of a malicious denial of service attack at an Internet Service Provider (ISP) node, in accordance with embodiments of the present invention.
Figure 5B:
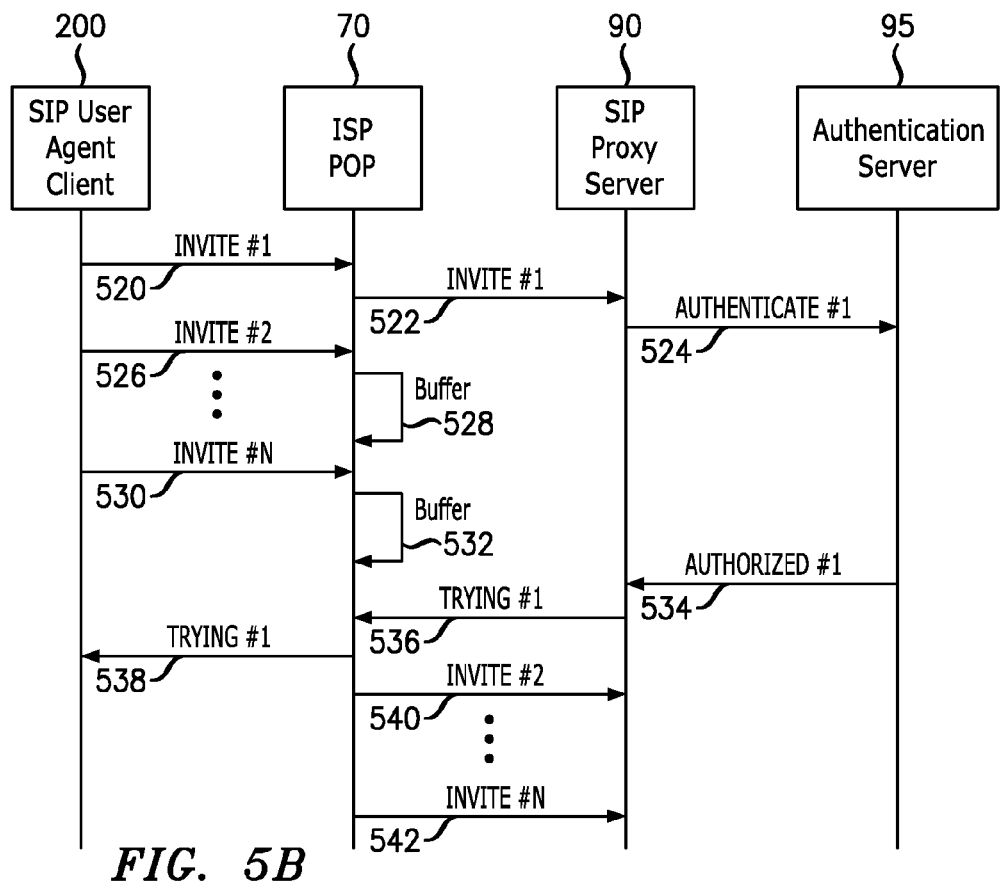

FIGS. 5A and 5B are message flow diagrams illustrating the suppression of a malicious denial of service attack at an Internet Service Provider (ISP) node, in accordance with embodiments of the present invention. FIG. 5A illustrates an exemplary prevention of additional SIP INVITE request messages from an unauthorized user agent client 200 from being forwarded to the SIP Proxy server 90, while FIG. 5B illustrates an exemplary forwarding of additional SIP INVITE request messages from an authorized user agent client 200 to the SIP Proxy server 90.

In FIG. 5A, upon receipt of an initial SIP INVITE request message with the RPH from a SIP user agent client 200 at the ISP node 70 at 500, the ISP node 70 forwards the initial SIP INVITE request message to the SIP Proxy server 90 at 502. The SIP Proxy server 90 then performs an authentication of the user agent client 200 for the RPH to the SIP authentication and authorization server 95 at 504. During the authentication process of the initial SIP INVITE request, if the ISP node 70 receives additional SIP INVITE request messages with the RPH at 506 and 510, the ISP node 70 buffers the additional SIP INVITE request messages at 508 and 512. Thereafter, if the initial SIP INVITE request message with RPH is unauthorized, i.e., an unauthorized message is transmitted from the SIP authentication and authorization server 95 to the SIP Proxy server 90, which in turn transmits a SIP PROXY AUTHENTICATION REQUIRED message to the ISP node 70 at 514 and 516, the ISP node 70 does not forward the buffered additional SIP INVITE request messages from the SIP user agent client 200 to the SIP Proxy server 90.

In FIG. 5B, upon receipt of an initial SIP INVITE request message with the RPH from a SIP user agent client 200 at the ISP node 70 at 520, the ISP node 70 forwards the initial SIP INVITE request message to the SIP Proxy server 90 at 522. The SIP Proxy server 90 then performs an authentication of the user agent client 200 for the RPH to the SIP authentication and authorization server 95 at 524. During the authentication process of the initial SIP INVITE request, if the ISP node 70 receives additional SIP INVITE request messages with the RPH at 526 and 530, the ISP node 70 buffers the additional SIP INVITE request messages at 528 and 532. Thereafter, if the initial SIP INVITE request message with RPH is authorized, i.e., an authorized message is transmitted from the SIP authentication and authorization server 95 to the SIP Proxy server 90 at 534, which in turn transmits a TRYING message to the SIP user agent client 200 via the ISP node 70 at 536 and 538, the ISP node 70 forwards the buffered additional SIP INVITE request messages from the SIP user agent client 200 to the SIP Proxy server 90 at 540 and 542.

Although the SIP Trying message is used in the example of FIG. 5B to indicate to the ISP node 70 that the SIP user agent client is authorized for the RPH, and therefore, the additional buffered SIP INVITE request messages with the RPH can be forwarded to the SIP Proxy server 90, in other embodiments, different messages may be used to indicate whether or not the SIP user agent client 200 is authorized. For example, in embodiments in which the ISP node 70 directly performs authentication of the initial SIP INVITE request message with the RPH from the SIP user agent client 200 to the SIP authentication and authorization server 95, an authorization message sent from the SIP authentication and authorization server 95 would provide the necessary indication that the SIP user agent client is authorized. As another example, in embodiments in which a SIP network node other than the ISP node 70 or the originating SIP Proxy server 90 performs the authorization, the ISP node 70 may wait until the Ringing message or OK message (shown in FIG. 3A) is transmitted from the SIP user agent server 210. As still a further example, an authentication message may be transmitted from a SIP network node (i.e., SIP Proxy server 90 or SIP user agent server) to the ISP node 70 to provide the necessary indication to the ISP node 70 of whether or not the SIP user agent client 200 is authorized. This authentication message may be the authentication message provided by the SIP authentication and authorization server 95 that is forwarded to the ISP node 70 or may be a new authentication message.

Figure 6:
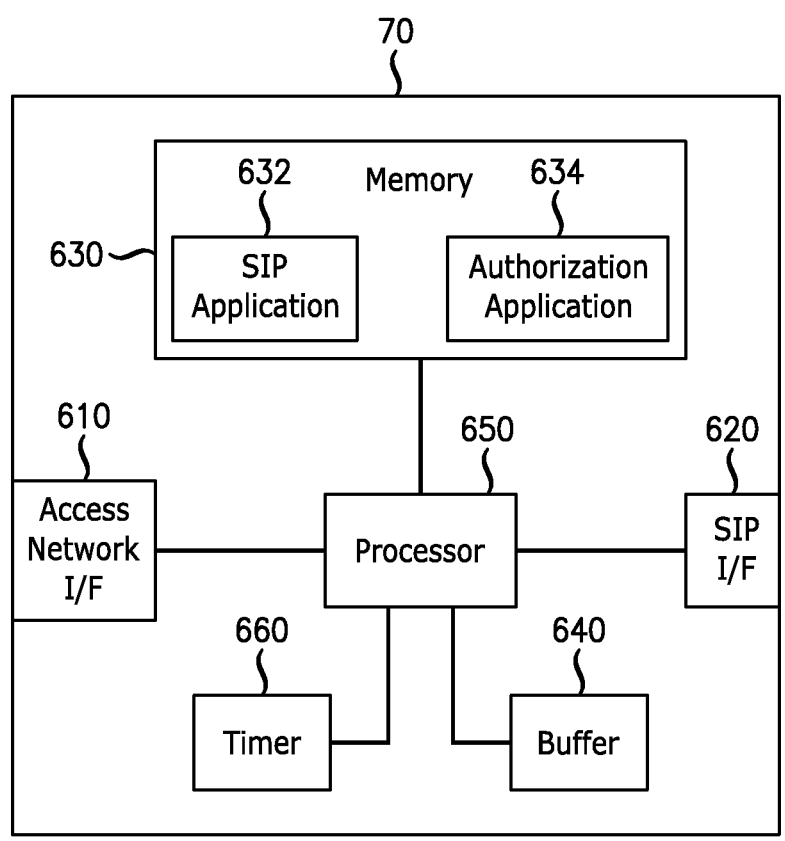
FIG. 6 is a block diagram illustrating an exemplary ISP node, in accordance with embodiments of the present invention.

FIG. 6 is a block diagram illustrating an exemplary ISP node 70, in accordance with embodiments of the present invention. The ISP node 70 includes an access network interface (I/F) 610 and a SIP interface (I/F) 620. The access network I/F 610 is coupled to one or more access networks to receive SIP request messages from and provide SIP response messages to user agent clients within the access networks. The SIP I/F 620 is coupled to the IP-based network to route SIP request messages to and receive SIP response messages from SIP nodes, i.e., a SIP Proxy server and/or SIP authorization and authentication node, within the IP-based network.

The ISP node 70 further includes a memory 630, a buffer 640, a processor 650 and a timer 660. The memory 630 includes a SIP application 632 and an authorization application 634. The SIP application 632 includes instructions executable by the processor 650 to process SIP request messages received from the access network via the access network I/F 610. For example, such processing can include determining whether the SIP request message includes an RPH, and if so, starting the authorization application 634, and identifying a SIP Proxy server to which the SIP request message will be routed. The authorization application 634 includes instructions executable by the processor 650 for authorizing one or more SIP request messages with the RPH to be forwarded to a SIP Proxy server. For example, such authorizing can include querying a SIP authentication and authorization server to authenticate a SIP user agent client for an RPH included within an initial SIP request message, forwarding the initial SIP request message with the RPH to the identified SIP Proxy server for subsequent authentication, rejecting additional SIP request messages with the RPH received from the SIP user agent client if the initial SIP request message was previously unauthorized, buffering additional SIP request messages with the RPH received from the same SIP user agent client within the buffer 640 until the initial SIP request message is authorized, deleting the contents of the buffer 640 for the SIP user agent client if the initial SIP request message is unauthorized and releasing the contents of the buffer 640 for the SIP user agent client if the initial SIP request message is authorized.

The authorization application 634 may further include instructions executable by the processor 650 for initializing the timer 660 upon receipt of an initial SIP request message with an RPH from a particular SIP user agent client. In addition, the authorization application 634 may include instructions executable by the processor 650 for deleting the contents of the buffer 640 for the particular SIP user agent client if authorization of the initial SIP request message is not received prior to time out of the timer 660. In an exemplary embodiment, the timer 660 is initialized to allow sufficient time for a SIP user agent client to retry a SIP INVITE request message with proper credentials. Thus, the processor 650 may not automatically delete the contents of the buffer 640 upon receipt of a SIP PROXY AUTHENTICATION REQUIRED message or a SIP UNAUTHORIZED message. Rather, the processor 650 may wait until the timer 660 times out, thereby giving the SIP user agent client sufficient time to retry the SIP INVITE request message with the proper credentials to be authenticated.

The processor 650 may be a microprocessor, micro-controller, digital signal processor, microcomputer, central processing unit, field programmable gate array, programmable logic device, state machine, logic circuitry, analog circuitry, digital circuitry, and/or any device that manipulates signals (analog and/or digital) based on operational instructions. The memory 630 may be a single memory device or a plurality of memory devices. Such a memory device may be a read-only memory, random access memory, volatile memory, non-volatile memory, static memory, dynamic memory, flash memory, and/or any device that stores digital information. Note that when the processor 650 implements one or more of its functions via a state machine, analog circuitry, digital circuitry, and/or logic circuitry, the memory 630 storing the corresponding operational instructions is embedded with the circuitry comprising the state machine, analog circuitry, digital circuitry, and/or logic circuitry.

Figure 7:
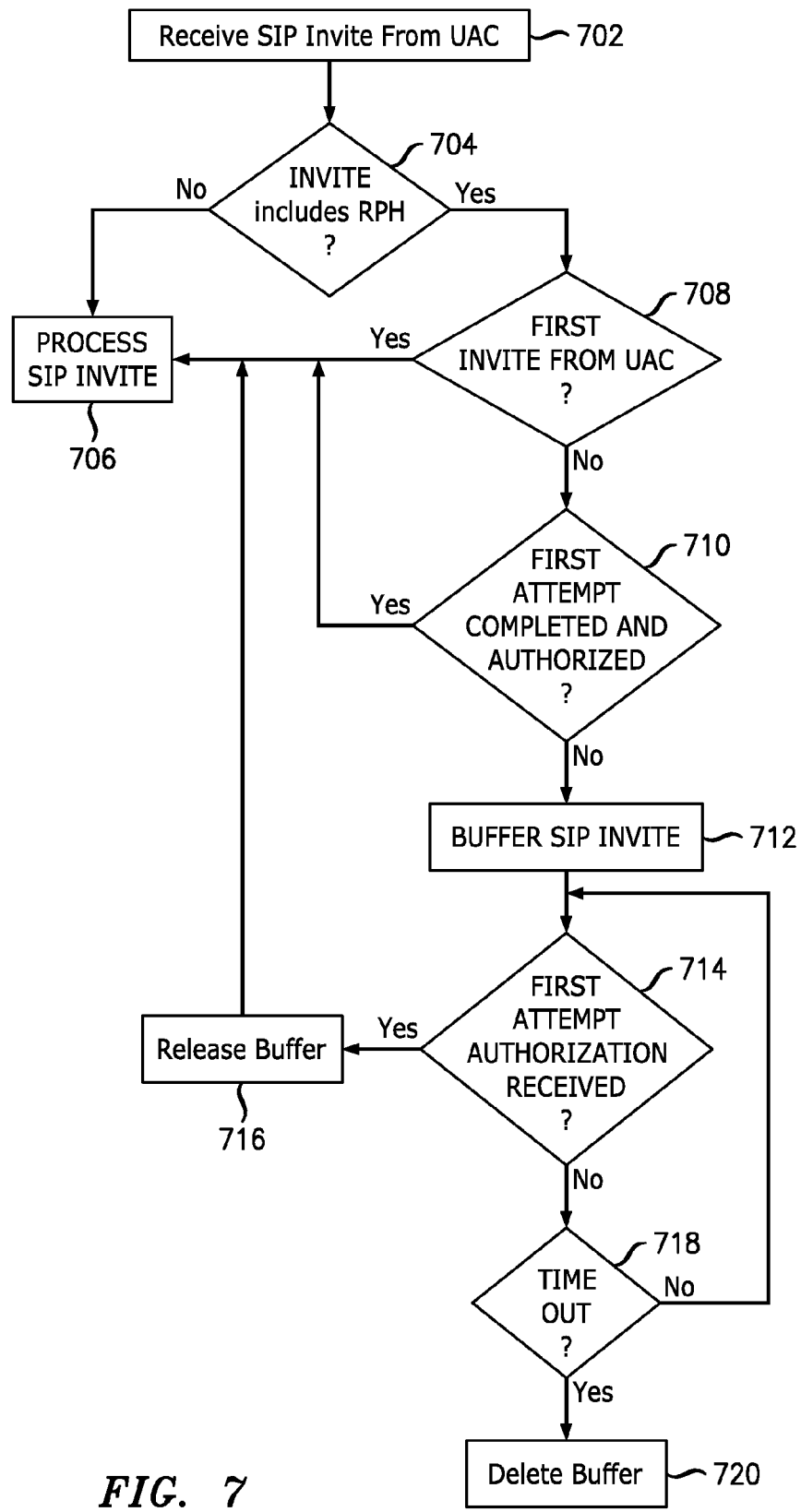
FIG. 7 is a flowchart illustrating an exemplary process for suppressing malicious SIP messages, in accordance with embodiments of the present invention.

FIG. 7 is a flowchart illustrating an exemplary process 600 for suppressing malicious session initiation protocol (SIP) messages. Initially, at 702, a new SIP INVITE request message is received at an originating ISP point of presence (POP) from a SIP user agent client (UAC). At 704, a determination is made whether the new SIP INVITE request message includes a RPH. If not, at 706, the SIP INVITE message is processed normally by the ISP node. If so, at 708, a determination is made whether the new SIP INVITE request message is the first (initial) SIP INVITE request message with an RPH received from the UAC. If so, the new SIP INVITE request message is processed normally by the ISP node at 706.

If not, at 710, a determination is made whether the initial SIP INVITE request message with the RPH sent from the UAC has already been authorized. If so, the new SIP INVITE request message is processed normally by the ISP node at 706. If not, the new SIP INVITE request message is stored in a buffer at 712. Thereafter, at 714, a determination is made whether the initial SIP INVITE request message with the RPH sent from the UAC has now been authorized. If so, at 716, the contents of the buffer for the UAC are released and the buffered SIP INVITE request messages from the UAC are processed normally by the ISP node at 706. If not, at 718, a determination is made whether a timer set when the initial SIP INVITE request message from the UAC was received by the ISP node has timed out. If not, the method proceeds back to 714 to wait for an authorization of the initial SIP INVITE request message or time out of the timer. If the timer has timed out, at 720, the contents of the buffer for the UAC are deleted and none of the buffered SIP INVITE request messages from the UAC, including the new SIP INVITE request message, are processed by the ISP node.

As will be recognized by those skilled in the art, the innovative concepts described in the present application can be modified and varied over a wide rage of applications. Accordingly, the scope of patents subject matter should not be limited to any of the specific exemplary teachings discussed, but is instead defined by the following claims.

We claim:

1. An Internet Service Provider (ISP) node within a communication network, comprising:
    an interface for receiving a new session initiation protocol (SIP) message from a user agent client associated with the ISP, the new SIP message including a resource priority header (RPH) indicating the new SIP message should be given priority within the communication network;
    a buffer operable to store the new SIP message; and
    a processor for placing the new SIP message in the buffer upon determining that the user agent client previously sent an initial SIP message with an RPH that has not yet been authorized, said processor further for releasing the new SIP message from the buffer and processing the new SIP message upon determining that the initial SIP message has been authorized.

2. The ISP node of claim 1, wherein the new SIP message and the initial SIP message are SIP INVITE requests.

3. The ISP node of claim 1, wherein the processor further places additional SIP messages with the RPH subsequently received from the user agent client into the buffer if authorization of the initial SIP has not yet been received.

4. The ISP node of claim 1, wherein the processor initiates a timer upon receipt of the initial SIP message.

5. The ISP node of claim 4, wherein the processor deletes the contents of the buffer if a time out of the timer occurs before authorization of the initial SIP message is received.

6. The ISP node of claim 4, wherein the processor releases the new SIP message in the buffer for normal processing when authorization of the initial SIP message is received prior to time out of the timer.

7. The ISP node of claim 1, wherein the processor applies normal message handling to the new SIP message when the new SIP message is a first SIP message from the user agent client.

8. The ISP node of claim 7, wherein the normal message handling includes the processor providing the new SIP message to a SIP authentication and authorization node for authentication and authorization of the new SIP message via an additional interface.

9. The ISP node of claim 1, wherein the processor rejects the new SIP message if authorization of the initial SIP message previously failed.

10. The ISP node of claim 1, wherein the ISP node is a point of presence positioned at an edge of an access network of the user agent client.

11. A method for suppressing malicious session initiation protocol (SIP) messages, comprising:
    receiving a new SIP message from a user agent client at an Internet Service Provider (ISP) node associated with the user agent client via a communication network, the new SIP message including a resource priority header (RPH) indicating the new SIP message should be given priority within the communication network;

placing the new SIP message in a buffer upon determining that the user agent client previously sent an initial SIP message with an RPH that has not yet been authorized; and releasing the new SIP message from the buffer and processing the new SIP message upon determining that the initial SIP message has been authorized.

12. The method of claim 11, wherein the new SIP message and the initial SIP message are SIP INVITE requests.

13. The method of claim 11, further comprising:
placing additional SIP messages with the RPH subsequently received from the user agent client into the buffer if authorization of the initial SIP has not yet been received.

14. The method of claim 11, further comprising:
initiating a timer upon receipt of the initial SIP message.

15. The method of claim 14, further comprising:
deleting the contents of the buffer if a time out of the timer occurs before authorization of the initial SIP message is received.

16. The method of claim 14, further comprising:
releasing the new SIP message in the buffer for normal processing when authorization of the initial SIP message is received prior to time out of the timer.

17. The method of claim 11, further comprising:
applying normal message handling to the new SIP message when the new SIP message is a first SIP message from the user agent client.

18. The method of claim 17, wherein the step of applying normal message handling further includes:
providing the new SIP message to a SIP authentication and authorization node for authentication and authorization of the new SIP message.

19. The method of claim 11, further comprising:
rejecting the new SIP message if authorization of the initial SIP message previously failed.

20. The method of claim 11, wherein the ISP node is a point of presence positioned at an edge of an access network of the user agent client.

\* \* \* \* \*